United States Patent Office 3,431,089
Patented Mar. 4, 1969

3,431,089
REACTION PRODUCTS AND PROCESSES
Vaughn A. Engelhardt, Wilmington, Del., assignor to E. I. du Pont de Nemours and Company, Wilmington, Del., a corporation of Delaware
No Drawing. Filed May 31, 1962, Ser. No. 199,572
U.S. Cl. 23—358         11 Claims
Int. Cl. C01b 35/00, 21/00

This invention relates to new compounds containing boron and to methods for preparing the compounds.

Boron compounds, principally salts of boric acid, have been in commercial use for many years. Recently other boron compounds, e.g., low molecular weight boron hydrides, have achieved technical importance in applications employing oxidizing and reducing agents. There are many potential applications, however, for which the available boron compounds are unsuited because of hydrolytic, oxidative or other types of instability. To illustrate, diborane, chlorodiborane, pentaborane(9) and trialkylboron compounds are spontaneously flammable in air. Diborane, pentaborane(9), chlorodiborane, boron trichloride, iododecaborane(14), and most other boron halides are hydrolyzed rapidly in water or alcohol. Even the most stable known borohydride, i.e., decaborane(14), is hydrolyzed at a moderate rate in water. Known ionic borohydrides, e.g., tetrahydroborates ($NaBH_4$, and the like), are hydrolyzed at a rapid rate at 100° C.

A broad class of boron compounds has now been found which show good hydrolytic and oxidative stability. The novel boron compounds of this invention are polyhydropolyborates consisting of (1) a group of 20 conjoined boron atoms and 18 hydrogen atoms bonded to boron, and (2) a group selected from ammonium, N-monosubstituted ammonium, N-disubstituted ammonium, hydrazinium, N-monosubstituted hydrazinium, and N-disubstituted hydrazinium which groups form cations in aqueous or alcoholic solutions.

The compounds of the invention are further defined by the following generic formula:

$$M_a(B_{20}H_{18})_b \qquad (1)$$

where M is a cation selected from ammonium, monosubstituted ammonium, disubstituted ammonium, hydrazinium, monosubstituted hydrazinimum and disubstituted hydrazinium groups; a and b are the smallest positive whole numbers which satisfy the equation:

$$b = \frac{a \times \text{valence of M}}{2} \qquad (2)$$

Thus, M is a cation which is derived from ammonia, primary amines, secondary amines, hydrazine, monosubstituted hydrazines and disubstituted hydrazines. The primary amines and secondary amines can have more than one primary or secondary amine group, e.g., diaminoethane, 1,6 - diaminohexane, 1,4 - diaminocyclohexane, 1,5 - diamino-3-azapentane, p-phenylenediamine, piperazine, and the like. Preferably the number of amine groups in the primary and secondary amines from which M is derived is at most three.

The cation groups which are within the scope of M can be represented as $NH_4^+$, $RNH_3^+$, $R_2NH_2^+$, $NH_2NH_3^+$, $R'NHNH_3^+$, $R'NHNR'H_2^+$, and $R'_2NNH_3^+$. R and R' are monovalent organic groups bonded to the nitrogen through carbon.

The characteristics of the R groups, which are bonded to the nitrogens of the cations derived from primary and secondary amines, are not critical features of these groups. Thus, the R groups can be open-chain, closed-chain, saturated or unsaturated hydrocarbon groups or substituted hydrocarbon groups. The R groups can be aliphatic, cycloaliphatic, aromatic or heterocyclic in character. When two R groups are bonded to nitrogen, the groups can form a ring of which the nitrogen is a member, e.g., morpholine, thiamorpholine, hexamethyleneimine, piperidine, piperazine, and the like. Preferably, for reasons of availability of amines, the R group contains a chain of 1–18 carbons with at most one interrupting atom which is oxygen, nitrogen or sulfur, in which chain any aliphatic unsaturation (i.e., unsaturation other than aromatic) is at most one carbon to carbon double bond and any substituents, if present, are halogen, cyano, hydroxyl or amine (the last group shares in cation formation). In a more restricted sense the R groups can be alkyl, cycloalkyl, alkenyl, cycloalkenyl, aryl, aralkyl, alkaryl, and heterocyclic. To illustrate, R can be methyl, 2-ethylhexyl, octadecyl, allyl, crotyl, octadecenyl, cyclohexyl, cyclohexenyl, phenyl, naphthyl, anthryl, phenanthryl, cyclohexylphenyl, terphenyl, chloroethyl, fluoropropyl, bromobutyl, β-hydroxyethyl, p-hydroxyphenyl, and the like.

R' groups bonded to hydrazinium cations are preferably alkyl or aryl groups of up to 8 carbons, e.g., methyl, ethyl, hexyl, octyl, phenyl, tolyl, xylyl, and the like. Thus, hydrazinium cations can be derived, e.g., from phenylhydrazine, methylhydrazine, 1,1-dimethylhydrazine, 1,2-dimethylhydrazine, ethylhydrazine, 1,1-diethylhydrazine, and similar compounds.

The valence of the cation M will be determined, of course, by the number of basic nitrogen groups which are present in the amine from which the cation is derived. To illustrate, cations from ammonia, hydrazines, mono- and disubstituted monoamines are monovalent, cations from diamino-substituted compounds are divalent, cations from triamino-substituted compounds are trivalent, and the like.

The group ($B_{20}H_{18}$)

The novel and characterizing feature of the compounds of the invention is the polyhydropolyborate group $(B_{20}H_{18})^{-2}$. The group is represented generically as having a negative ionic charge of 2 and the group, therefore, behaves in chemical reactions as a divalent anion. The group, chemically, is exceptionally stable. It is not easily decomposed by hydrolysis, oxidation or reduction and it is resistant to thermal decomposition. The group is unchanged in simple metathetic reactions, a property which allows the preparation of a broad range of salts in which the cation is represented by M, as defined in Formula 1.

In addition to its exceptional stability, the $B_{20}H_{18}^{-2}$ anion undergoes electrophilic substitution reactions in a manner which resembles the behavior of carbocyclic aromatic compounds, e.g., benzene and naphthalene, to obtain compounds in which 1 to 18 hydrogens bonded to boron are replaced by monovalent substituents (organic and inorganic).

The behavior of the boron-containing group in substitution reactions is particularly surprising in view of the inorganic composition of the group.

Characteristics of the compounds

The compounds are generally crystalline solids with the high-melting points which are characteristic of salts. They are stable under conventional storage conditions and can be kept for prolonged periods without decomposition. The salts are generally yellow in color and they are soluble in hydroxylated solvents, e.g., water, alcohol, and the like, to form intensely yellow solutions. The compounds show characteristic and identifying absorption bands in the infrared spectrum at approximately the following wavelengths (expressed as microns): 11.3, medium; 11.5, strong; 12.1, strong; 12.8, medium; 13.4, strong; 13.7, medium, shoulder; 14.4, strong; and 15.0, strong. Shifts in the characteristic bands can occur through the influence of the cation in the compound and some variation in the above values may, therefore, be noted.

The following examples illustrate the compounds of the invention:

$(NH_4)_2B_{20}H_{18}$, $(CH_3NH_3)_2B_{20}H_{18}$, $(C_4H_9NH_3)_2B_{20}H_{18}$
$(C_{18}H_{37}NH_3)_2B_{20}H_{18}$, $(C_{18}H_{35}NH_3)_2B_{20}H_{18}$
$[(C_2H_7)_2NH_2]_2B_{20}H_{18}$, $[(C_3H_5)_2NH_2]_2B_{20}H_{18}$
$(iso\text{-}C_3H_7NH_3)_2B_{20}H_{18}$, $(sec\text{-}C_4H_9NH_3)_2B_{20}H_{18}$
$(C_5H_{10}NH_2)_2B_{20}H_{18}$, $(C_6H_5NH_3)_2B_{20}H_{18}$
$(C_6H_5\text{-}C_6H_4NH_2)_2B_{20}H_{18}$, $(C_{10}H_8NH_3)_2B_{20}H_{18}$
$(NH_3CH_2C_2N_3)B_{20}H_{18}$, $[NH_3(CH_2)_6NH_3]B_{20}H_{18}$
$[CN(CH_2)_4CH_2NH_3]_2B_{20}H_{18}$, $(HOCH_2CH_2NH_3)_2B_{20}H_{18}$
$(ClCH_2CH_2NH_3)_2B_{20}H_{18}$, $(HOC_6H_4NH_3)_2B_{20}H_{18}$
$(FC_6H_4N_3)_2B_{20}H_{18}$, $(BrC_6H_4NH_3)_2B_{20}H_{18}$
$(NH_2NH_3)_2B_{20}H_{18}$, $(CH_3NHNH_3)_2B_{20}H_{18}$
$[(CH_3)_2NNH_3]_2B_{20}H_{18}$, $(C_6H_5NHNH_3)_2B_{20}H_{18}$ and the like.

Preparation of the compounds

The compounds of the invention are obtained by oxidizing a decahydrodecaborate(2−) salt, isolating a salt of the octadecahydroeicosaborate(2−) from the reaction mixture and, optionally, contacting the salt so obtained with a salt having the cation M, and isolating a compound of Formula 1.

In the nomenclature used above the numbers in parenthesis, e.g., (2−), represent the valence of the anion.

The decahydrodecaborate salt employed as a reactant in the oxidation step is a compound of the following formula:

$$M'_{a'}(B_{10}H_{10})_{b'} \qquad (3)$$

where M′ is a cation, i.e., a group which bears a positive charge in aqueous solution, and a′ and b′ represent the smallest positive whole numbers which satisfy the equation $$b' = \frac{a' \times \text{valence of M'}}{2} \qquad (4)$$

The compounds of Formula 3 are not commonly known and preparation of a representative compound is described in the examples. Any decahydrodecaborate(2−) can be employed, i.e., compounds in which M′ is any group which can form a cation in water, are operable. For reasons of availability and cost, it is preferred to use decahydrodecaborates of Formula 3 in which M is hydrogen, hydronium, ammonium, substituted ammonium, an alkali metal or an alkaline earth metal. Specific illustrations of the classes of preferred reactants are $H_2B_{10}H_{10}$ and its hydrates, $Na_2B_{10}H_{10}$, $Cs_2B_{10}H_{10}$, $K_2B_{10}H_{10}$, $Li_2B_{10}H_{10}$
$BaB_{10}H_{10}$, $CaB_{10}H_{10}$, $MgB_{10}H_{10}$, $(NH_4)_2B_{10}H_{10}$
$[(CH_3)_4N]_2B_{10}H_{10}$, $[(CH_3)_2NH_2]_2B_{10}H_{10}$ and the like.

Oxidation step to $B_{20}H_{18}^{-2}$ compounds

Oxidation of the decahydrodecaborate reactant is accomplished either chemically or electrolytically.

In chemical oxidation the oxidizing reagent or oxidant is a compound having as a characteristic component a metal of variable valence, which metal is in its highest valence state, said compound having an oxidation-reduction potential in acid solution of about −1.33 to about −1.61 volts. The oxidation-reduction potential of a compound is a recognized and measurable property for which values are found in readily available texts, e.g., "Oxidation Potentials," by W. G. Latimer, 2nd ed., Prentice-Hall, New York (1952), particularly p. 344. Examples of classes of compounds which are operable in the process are dichromates, aurates, higher oxides of lead, manganic salts, permanganates, higher oxides of bismuth and salts of tetravalent cerium.

The chemical oxidation process is conducted by simple and uncomplicated procedures in conventional equipment. A solvent is generally employed which preferably is hydroxylated, e.g., methanol, water, and the like. Water is most conveniently used and it is therefore the preferred solvent.

The ratio in which the reactants are employed is not a critical factor for operability. However, the use of an excess of oxidant may lead to a decrease in yield of the desired product. It is preferable to employ at most two oxidation equivalents of the oxidant (based on the metal) per mole of $B_{10}H_{10}^{-2}$ salt or acid used in the process. The preferred mole ratio of oxidant to polyhydropolyborate can be determined by methods described in Handbook of Chemistry and Physis, 38th ed., p. 1588, Chemical Rubber Publishing Co. (1956).

Pressure is not a critical factor in the process and atmospheric pressure is normally used. However, if desired, pressures higher or lower than atmospheric can be employed. The temperature of the reaction is also not critical. Normally, the reaction is conducted at prevailing atmospheric temperature but temperatures as low as 0° C. and as high as 100° C. can be employed. Preferred temperatures of operation lie between about 10° and 75° C.

The reaction proceeds rapidly and a measurable quantity of product is obtained within a short time. Normally the reactants are maintained in contact for a sufficient period to assure maximum yield. The time of reaction can range from a few minutes to 24 hours or more.

In the operation of the process it is preferable (although not essential) to add the oxidant to the decaborate to reduce the vigor of the reaction and to obtain the maximum yield of desired product. Normally, therefore, the reaction vessel is charged with the solvent and the decahydrodecaborate. The chemical oxidant, which is handled conveniently in solution, is added gradually to the vessel at a rate which provides a controllable reaction. After all of the oxidant has been added, the reaction mixture can be stirred for a short period and a solution containing a compound having a desired cation is added. At this stage in the process the solution which is added can contain a cation which falls within the scope of M as defined in Formula 1 or it can be any other cation-forming group. Frequently salts of alkali metals or of quaternary ammonium bases are employed. The selection of the cation at this point in the process is solely a matter of convenience and availability of reactants.

The polyborate salt may precipitate at this stage but, in the event precipitation does not occur, the solution is evaporated to a volume at which the solid separates. The product is purified by conventional procedures, e.g., crystallization, to obtain a salt of the divalent anion, $B_{20}H_{18}^{-2}$ having a cation which falls within the scope of M in Formula 1 or within the broader scope of M′ in Formula 3.

The electrolytic oxidation process is conducted by well known procedures which are described in texts, e.g., see Glasstone, "Introduction to Electrochemistry," Chap. XV, D. Van Nostrand Co., 5th ed. (1951). The decahydrodecaborate salt is dissolved in an aprotic solvent to provide a solution of satisfactory conductivity to which sufficient current is applied to release gas at the cathode. An aprotic solvent is a liquid which has no tendency to release or to accept protons (see Möeller, "Inorganic Chemistry," p. 312 (1954), John Wiley & Sons, Inc.).

The solvents employed in the process are usually polar organic liquids, e.g., nitriles, tertiary nitrogen bases, N,N-disubstituted amides, and the like. Examples of suitable solvents are acetonitrile, pyridine, N,N-dimethylaniline, dimethylformamide, and combinations of these liquids. A current of at least one ampere and one volt is usually employed. These conditions are not critical and they are used solely to illustrate a satisfactory method of operation. The process is conducted conveniently at atmospheric temperature, i.e., about 25° C. although lower and higher temperatures can be used, e.g., as low as 0° C. or as high as 100° C. The preferred temperature range lies between 10° and 60° C.

The salt is isolated in the electrolytic oxidation process by methods described for the chemical oxidation process.

In the event the salt of the $B_{20}H_{18}^{-2}$ anion, as isolated in the above processes, does not contain a cation M which falls within the scope of Formula 1 or in the event it is desired to obtain a salt with a different cation M, the octadecahydroeicosaborate salt, as isolated from the process, can be reacted with a wide range of salts which have a cation which falls within the scope of the definition of M to obtain the compounds of the invention. This optional step in the process is simply a metathetic reaction of the kind which is well known in chemical work.

A second optional procedure which is convenient and of wide operability consists in contacting a solution of the $B_{20}H_{18}^{-2}$ salt, as isolated in the process, with a strong acid to obtain a solution of the acid $H_2B_{20}H_{18}$ [expressed also as $(H_3O)_2B_{20}H_{18}$]. To illustrate, a solution of a $B_{20}H_{18}^{-2}$ salt is contacted with a solution of hydrogen chloride or with a commercial acid ion-exchange resin of the crosslinked polystyrenesulfonic acid type. The solutions of the acid obtained in this manner can be neutralized with ammonia, primary and secondary amines, hydrazine and substituted hydrazines to obtain compounds of Formula 1, generally in solution. These solutions can be concentrated under reduced pressure to obtain the compounds of Formula 1 in a solid crystalline state.

The products of the invention and processes for obtaining them are illustrated in the following examples. The preparation of a representative compound of the type $M'_{a'}(B_{10}H_{10})_{b'}$, which is employed as a principal reactant, is illustrated in Example A and the preparation of the acid and certain salts of the $B_{20}H_{18}^{-2}$ anion, employed in metathetic reactions, is illustrated in Examples B through D.

EXAMPLE A (A) Preparation of bis(dimethyl sulfide)decaborane (12)

A reaction vessel having a capacity of about 365 g. of water is charged with 0.79 g. of decaborane(14), cooled in liquid nitrogen, and then evacuated to a pressure of 10 microns of mercury. Approximately 21 g. of dimethyl sulfide is condensed onto the decaborane in the reaction vessel. The reaction vessel is closed, allowed to warm to room temperature and stand for 4 days. During this time, 6.6 millimoles of hydrogen is evolved. The reaction vessel is opened and excess dimethyl sulfide is removed by distillation, leaving a practically quantitative yield of white solid residue of $B_{10}H_{12} \cdot 2(CH_3)_2S$. The compound is recrystallized from ethyl acetate and it melts at 122–124° C. The compound is called bis(dimethyl sulfide)decaborane (12).

The above procedure is equally operable with other organic sulfides.

(B) Preparation of $M'_2B_{10}H_{10}$ (where M' is $NH_4$)

Bis(dimethyl sulfide)decaborane(12) (8.5 g.) is mixed with 50 ml. of liquid ammonia and stirred in a round-bottom reaction vessel for 1 hour with the vessel being cooled to a temperature of about $-50°$ C. by partial immersion in a bath of a mixture of solid carbon dioxide and acetone. The cooling bath is then removed and the excess ammonia is allowed to evaporate with stirring. The remaining traces of ammonia are removed by subjecting the residue to a high vacuum (0.01 mm. of mercury) at 25° C. There is obtained 5.6 g. of solid residue which is virtually a quantitative yield of $(NH_4)_2B_{10}H_{10}$.

EXAMPLE B

A reaction vessel is charged with 100 ml. of water and 1.46 g. of $(NH_4)_2B_{10}H_{10}$. The mixture is stirred and a solution of 5.4 g. of $Ce(NH_4)_2(NO_3)_6$ in 80 ml. of water is added gradually. Evolution of gas occurs and a deep blue-violet solution forms. A concentrated aqueous solution of $(CH_3)_4NCl$ is added to the reaction mixture with stirring and in sufficient amount to precipitate completely a violet-colored solid. The solid is separated by filtration and it is purified by crystallization from hot water to yield the yellow compound, bis(tetramethylammonium) octadecahydroeicosaborate (2−).

The compound is soluble in acetonitrile, hot methanol and hot water. The identity of the product is confirmed by elemental analysis.

*Analysis.*—Calc'd for $[(CH_3)_4N]_2B_{20}H_{18}$: C, 25.10; H, 11.06; N, 7.32; B, 56.64; eq. wt., 191.4. Found: C, 26.28; H, 11.49; N, 7.55, 7.80; B, 54.28; eq. wt., 188, 204.

The identity of the compound is further confirmed by measuring the number of moles of hydrogen obtained from the boron moiety $(B_{20}H_{18})$ upon complete hydrolysis to boric acid. The values for moles $H_2$, obtained per mole $[(CH_3)_4N]_2B_{20}H_{18}$, are as follows: Calc'd, 40.0; found, 39.904 and 40.086.

EXAMPLE C

A solution of $[(CH_3)_4N]_2B_{20}H_{18}$ in methanol-water is passed through a column packed with a commercial acidic ion-exchange resin of the polyarylsulfonic acid type. The effluent is a solution of the acid $H_2B_{20}H_{18}$, or, expressed as a hydronium acid, $(H_3O)_2B_{20}H_{18}$. The aqueous solution is used without further processing to prepare salts of the acid.

The solid acid is obtained by evaporating the aqueous solution, prepared as described above, to dryness at very low pressure (less than 0.1 mm. of mercury). The acid, which forms large intensely colored yellow crystals, contains 6 moles of water of hydration, of which 2 moles are considered to be associated with the proton cations. The identity of the compound is confirmed by elemental analysis.

*Analysis.*—Calc'd for $(H_3O)_2B_{20}H_{18} \cdot 4H_2O$: H, 9.36; B, 62.80. Found: H, 8.91; B, 63.65.

The solid yellow crystals of the hydrated acid obtained above are very hygroscopic. They dissolve in water to form clear solutions.

EXAMPLE D

A portion of an aqueous solution of the dibasic acid, prepared as described in Example C, is titrated with an aqueous solution of sodium hydroxide until the reaction mixture is neutral (pH=7). The resulting aqueous solution is yellow and its ultraviolet spectrum shows absorption in regions which are characteristic for salts of the $B_{20}H_{18}$ anion.

The yellow solution is evaporated to dryness under reduced pressure (less than 1 mm. of Hg) to obtain crude $Na_2B_{20}H_{18}$ as a tan-colored solid. The compound is purified by crystallization from methanol. The product so obtained contains water of crystallization.

*Analysis.*—Calc'd for $Na_2B_{20}H_{18} \cdot 2H_2O$: B, 68.34; H, 7.07. Found: B, 68.21; H, 7.25.

The compound can, if desired, be obtained free of solvent of crystallization by heating for a time at very low pressure. The molecular weight of the compound $Na_2B_{20}H_{18}$, determined by freezing point depression in aqueous solution, gives the following values: 103, 99, 89, 88, i.e., an average mol. wt. of 95; calc'd value: 93.3.

The ultraviolet spectrum of the sodium salt in solution in acetonitrile shows major absorption maxima at 282 mμ and 233 mμ.

The processes of Examples B through D illustrate generic methods of preparing salts and the acid of the $B_{20}H_{18}^{-2}$ anion. Compounds of Formula 1 can be obtained directly from the oxidation process by employing in the final step a salt which has the cation M as defined for Formula 1. To illustrate, in Example B, $NH_4Cl$, $CH_3NH_3Cl$, $C_6H_5NH_3Cl$, $C_6H_5(CH_3)NH_2Cl$, and the like can be used in place of $(CH_3)_4NCl$ to obtain $(NH_4)_2B_{20}H_{18}$, $(CH_3NH_3)_2B_{20}H_{18}$, $(C_6H_5NH_3)_2B_{20}H_{18}$, $(C_6H_5NH_2CH_3)_2B_{20}H_{18}$, and the like salts directly.

The acid of Example C can, of course, be neutralized with ammonium hydroxide or with any primary or secondary amine to obtain compounds of Formula 1. This procedure is illustrated in Examples I and VI, and it is also illustrated for an alkali metal hydroxide in Example D to obtain a metal salt for further metathetic reactions.

EXAMPLE I

An aqueous solution of $H_2B_{20}H_{18}$, prepared as described in Example C, is neutralized with an aqueous solution of $NH_4OH$ to a pH value of 7. The solution, which is clear yellow, is evaporated to dryness, leaving $(NH_4)_2B_{20}H_{18}$ as a pale yellow solid residue. The identity of the compound is confirmed by its infrared absorption spectrum which shows bands at 3.08μ, 3.92μ, 4.0μ and 7.09μ and also in the 10–15μ region.

*Analysis.*—Calc'd for $(NH_4)_2B_{20}H_{18} \cdot 1/2H_2O$: N, 10.02; H, 9.73; B, 77.40. Found: N, 10.09, 10.18; H, 9.55, 9.87; B, 77.74, 77.60.

The process of Example I illustrates the preparation of the compounds of the invention by neutralization of the acid, $H_2B_{20}H_{18}$, with a nitrogen base The process is generic for the preparation of compounds of Formula 1. To illustrate, a solution of the acid $H_2B_{20}H_{18}$ is neutralized with $C_8H_{17}NH_2$ to obtain $(C_8H_{17}NH_3)_2B_{20}H_{18}$, with $C_{18}H_{37}NH_2$ to obtain $(C_{18}H_{37}NH_3)_2B_{20}H_{18}$, with $(CH_3)_3CNH_2$ to obtain $[(CH_3)_3CNH_3]_2B_{20}H_{18}$, and with $HOCH_2CH_2CH_2NH_2$ to obtain $(HOCH_2CH_2CH_2NH_3)_2B_{20}H_{18}$

EXAMPLE II

A quantity (ca. 1 ml.) of isopropylamine is neutralized with aqueous dilute hydrochloric acid. An aqueous solution containing an equivalent quantity of $Na_2B_{20}H_{18}$, prepared as described in Example D, is added to the solution with stirring The solution is cooled with stirring and a flocculent precipitate forms. The precipitate is separated and dried in air to obtain di(isopropylammonium) octadecahydroeicosaborate(2−). The identity of the compound which has the formula $[(CH_3)_2CHNH_3]_2B_{20}H_{18}$ is confirmed by its infrared absorption spectrum.

The process of Example II illustrates the preparation of compounds of Formula 1 where M is derived from an aliphatic primary amine. It also illustrates the process in which the nitrogen base is employed in the form of a salt with a mineral acid. The process is generically applicable to the preparation of salts of this type by a simple metathetic reaction employing alkali metal salts of $B_{20}H_{18}$. To illustrate, $Na_2B_{20}H_{18}$ is reacted with the hydrochlorides of $CH_3NH_2$ to obtain $(CH_3NH_3)_2B_{20}H_{18}$, of $C_4H_9NH_2$ to obtain $(C_4H_9NH_3)_2B_{20}H_{18}$, of $C_{10}H_{22}NH_2$ to obtain $(C_{10}H_{22}NH_3)_2B_{20}H_{18}$, of $CH_3(CH_2)_3CH(C_2H_5)CH_2NH_2$ to obtain $[CH_3(CH_2)_3CH(C_2H_5)CH_2NH_2NH_3]_2B_{20}H_{18}$, of $C_{18}H_{37}NH_2$ to obtain $(C_{18}H_{37}NH_3)_2B_{20}H_{18}$, of $C_3H_7NH_2$ to obtain $(C_3H_7NH_3)_2B_{20}H_{18}$, of $C_{18}H_{35}NH_2$ to obtain $(C_{18}H_{35}NH_3)_2B_{20}H_{18}$, of $C_{10}H_{21}NH_2$ to obtain $(C_{10}H_{21}NH_3)_2B_{20}H_{18}$ of $C_6H_{11}NH_2$ to obtain $(C_6H_{11}NH_3)_2B_{20}H_{18}$, of $C_2H_5OC_2H_4NH_2$ to obtain $(C_2H_5OC_2H_4NH_3)_2B_{20}H_{18}$, of $HOCH_2CH_2NH_2$ to obtain $(HOCH_2CH_2NH_3)_2B_{20}H_{18}$, of $ClCH_2CH_2NH_2$ to obtain $(ClCH_2CH_2NH_3)_2B_{20}H_{18}$, of $\overline{CH_2CH_2OCH_2}CHNH_2$ to obtain $(\overline{CH_2CH_2OCH_2}CHNH_3)_2B_{20}H_{18}$, and with the hydrochloride of $HOOC(CH_2)_3CH_2NH_2$ to obtain $[HOOCCH_2(CH_2)_3CH_2NH_3]_2B_{20}H_{18}$.

The hydrochlorides of amino acids, e.g., glycine, alanine, tyrosine, and the like can be reacted with an alkali metal salt of $B_{20}H_{18}^{-2}$ to obtain salts such as $(HOOCCH_2NH_3)_2B_{20}H_{18}$, $[HOOCCH(CH_3)NH_3]_2B_{20}H_{18}$, and $[HOOCCH(CH_2C_6H_4OH)NH_3]_2B_{20}H_{18}$.

Hydrochlorides of diamines can be employed in the process, e.g., $Na_2B_{20}H_{18}$ can be reacted with the hydrochlorides of 1,2-diaminoethane to yield $(NH_2CH_2CH_2NH_3)_2B_{20}H_{18}$, of 1,6-diaminohexane to yield $[NH_2(CH_2)_6NH_3]_2B_{20}H_{18}$, and the like.

Salts other than hydrochlorides can be employed, e.g., sulfate and phosphate salts of amines are operable.

EXAMPLE III

A reaction vessel is charged with about 1 ml. of aniline and dilute hydrochloric acid is added until the solution is slightly acid. An aqueous solution containing approximately an equivalent quantity of $Na_2B_{20}H_{18}$, prepared as described in Example D, is added gradually with stirring. The solution, which is clear at this point, is cooled and stirred. A precipitate forms which is separated by filtration and dried in air. The product so obtained is $(C_6H_5NH_3)_2B_{20}H_{18}$. Its identity is confirmed by its infrared absorption spectrum.

Example III illustrates the preparation of compounds of Formula 1 where M is derived from an aromatic primary amine, employing a simple metathetic reaction. It also illustrates the process employing the aromatic amine in the form of a salt with a mineral acid. The process is generic to the preparation of salts of this type. Any alkali metal or alkaline earth metal salt of $B_{20}H_{18}^{-2}$ can be employed, e.g., the Li, Na, K, Rb, Ca, Ba, Mg, and like salts. To illustrate, $Na_2B_{20}H_{18}$ can be reacted with the hydrochlorides of $ClC_6H_4NH_2$ to obtain $(ClC_6H_4NH_3)_2B_{20}H_{18}$ of $BrC_6H_4NH_2$ to obtain $(BrC_6H_4NH_3)_2B_{20}H_{18}$, of $FC_6H_4NH_2$ to obtain $(FC_6H_4NH_3)_2B_{20}H_{18}$, of $C_{10}H_7NH_2$ to obtain $(C_{10}H_7NH_3)_2B_{20}H_{18}$, of $HOC_6H_4NH_2$ to obtain $(HOC_6H_4NH_3)_2B_{20}H_{18}$, of $(C_6H_5)_2NH$ to obtain $[C_6H_5)_2NH_2]_2B_{20}H_{18}$ of $CH_3C_6H_4NH_2$ to obtain $(CH_3C_6H_4NH_3)_2B_{20}H_{18}$, and of $C_{12}H_{25}C_6H_4NH_2$ to obtain $(C_{12}H_{25}C_6H_4NH_3)_2B_{20}H_{18}$. Hydrochlorides of aralkylamines are operable and can be employed, e.g., $C_6H_5CH_2NH_2 \cdot HCl$ and $Na_2B_{20}H_{18}$ yield $(C_6H_5CH_2NH_3)_2B_{20}H_{18}$. Hydrochlorides of aromatic amines with two or more amine groups can be employed, e.g., $Na_2B_{20}H_{18}$ reacts with the hydrochlorides of $NH_2C_6H_4NH_2$ to yield $(NH_2C_6H_4NH_3)_2B_{20}H_{18}$, of triaminobenzene to yield $[C_6H_3(NH_3)_3]_2(B_{20}H_{18})_3$, and the like.

The process is operable with other mineral acid salts of aromatic amines, e.g., sulfate and phosphate salts.

EXAMPLE IV

A reaction vessel is charged with approximately 1 ml. of dicyclohexylamine. Aqueous dilute hydrochloric acid is added gradually and a pale yellow solid forms. The solid is dissolved in hot aqueous methanol and an aqueous solution of $Na_2B_{20}H_{18}$, prepared as described in Example D, is added with stirring. The solution is cooled to about 25° C. and a yellow solid precipitates. The solid is separated and dried in air to obtain bis(dicyclohexylammonium)octadecahydroeicosaborate(2−) as a yellow crystalline compound. The identity of the compound, which has the formula $[(C_6H_{11})_2NH_2]_2B_{20}H_{18}$, is confirmed by its infrared absorption spectrum.

The process of Example IV illustrates the preparation of compounds of Formula 1 from secondary amines. The process is generically applicable to the preparation of compounds of this type. To illustrate, an alkali metal salt of $B_{20}H_{18}^{-2}$ will react with the hydrochlorides of $C_6H_{11}NHCH_3$ to obtain $(C_6H_{11}NH_2CH_3)_2B_{20}H_{18}$, of $CH_3NHC_8H_{17}$ to obtain $(CH_3NH_2C_8H_{17})_2B_{20}H_{18}$, of $(C_{12}H_{25})_2NH$ to obtain $[(C_{12}H_{25})_2NH_2]_2B_{20}H_{18}$, of $(C_3H_7)_2NH$ to obtain $[(C_3H_7)_2NH_2]_2B_{20}H_{18}$, of $$(ClCH_2CH_2)_2NH$$

to obtain $[(ClCH_2CH_2)_2NH_2]_2B_{20}H_{18}$, of $C_6H_5NHCH_3$ to obtain $(C_6H_5NH_2CH_3)_2B_{20}H_{18}$, of $C_{10}H_7NHC_2H_5$ to obtain $(C_{10}H_7NH_2C_2H_5)_2B_{20}H_{18}$, and of $$(HOCH_2CH_2)_2NH$$

to obtain $[(HOCH_2CH_2)_2NH_2]_2B_{20}H_{18}$.

Amine salts of other mineral acids, as described for earlier examples, can be used in the process of Example IV.

EXAMPLE V

A reaction vessel is charged with approximately 1 ml. of piperidine and dilute hydrochloric acid is added until the solution is slightly acid. An aqueous solution of $H_2B_{20}H_{18}$, prepared as described in Example C, is added gradually to the piperidinium hydrochloride solution until no further precipitation of a solid occurs. The precipitate is separated by filtration and dried in air to obtain substantially pure dipiperidinium octadecahydroeicosaborate as a yellow crystalline solid. The identity of the compound, which has the formula $(C_5H_{10}NH_2)_2B_{20}H_{18}$, is confirmed by its infrared absorption spectrum.

The process of Example V illustrates the compounds of the invention where M is a heterocyclic amine. The process is generic to compounds of this type. To illustrate, the acid $H_2B_{20}H_{18}$ will react with the hydrochlorides of morpholine to form 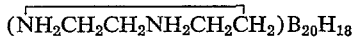, of  to yield $$(\overline{NH_2CH_2CH_2NH_2CH_2CH_2})B_{20}H_{18}$$

and of $\overline{CH_2CH_2NHCH_2CH_2}$ to yield $$(\overline{CH_2CH_2NH_2CH_2CH_2})_2B_{20}H_{18}.$$

EXAMPLE VI

About 0.5 g. of the crystalline acid, dihydrogen octadecahydroeicosaborate(2−) containing 5–6 moles of water of hydration (prepared as described in Example C) is mixed with sufficient hydrazine (95%+ purity) to form a solution of $(NH_2NH_3)_2B_{20}H_{18}$ in hydrazine. The solution is yellow in color.

The dihydrazinium octadecahydroeicosaborate(2−) can be used in hydrazine solution or it can be isolated by careful evaporation of the solution at low temperatures (about 30° C. or less) under reduced pressure to form a crystalline, hygroscopic solid.

The dihydrazinium salt dissolves readily in hydrazine to form solutions which contain a high concentration of the $B_{20}H_{18}^{-2}$ anion. The solutions, preferably, are maintained at room temperature (ca. 25° C.) or lower. When the solutions are warmed, bubbles form and a gas is released.

The mixture now at this stage is a solution of $$(NH_2NH_3)_4B_{20}H_{18}$$

in hydrazine.

The solution is diluted with water and an aqueous solution of $TlNO_3$ is added. The precipitate which forms is separated and dried in air to yield $Tl_4B_{20}H_{18}$ as a hydrate. The compound is a white crystalline product whose identity is confirmed by its infrared absorption spectrum.

$(NH_2NH_3)_4B_{20}H_{18}$ is conveniently handled in solution in hydrazine from which it can be isolated, if desired, as a white crystalline solid, by evaporation of the hydrazine. Hydrazine solutions of $(NH_2NH_3)_4B_{20}H_{18}$ containing up to 50% or more by weight of the salt are stable compositions having a high boron content.

The process of Example VI illustrates the compounds of Formula 1 where M is derived from a hydrazine. The process is generic to compounds of this type. To illustrate, the acid $H_2B_{20}H_{18}$ will react with $(CH_3)_2NNH_2$ to form $[(CH_3)_2NNH_3]_2B_{20}H_{18}$, with $C_4H_9NHNH_2$ to form $(C_4H_9NHNH_3)_2B_{20}H_{18}$, and with $C_6H_5NHNH_2$ to form $(C_6H_5NHNH_3)_2H_{20}H_{18}$.

The invention provides a broad class of new boron compounds which find applications in many fields.

The compounds of the invention are useful as impregnating agents in the preparation of ressitors. To illustrate, a section of a cotton string is immersed in a nearly saturated solution of $(NH_4)_2B_{20}H_{18}$ in water. The string is withdrawn from the solution and the solvent is removed by drying in air air. A free flame is applied to the dried impregnated string and it burns freely and vigorously to yield a coherent ash which in size and shape resembles the original string. The residual skeleton is of sufficient coherence to permit embedding in paraffin. The section of residue, so treated, shows a resistance on the order of 700,000 ohms./cm. The residue from a control section of string is very small and shapeless and it cannot be handled.

All of the compounds of the invention are useful as components of fireworks compositions to impart a pleasing color and sparkle to the display, e.g., $(NH_4)_2B_{20}H_{18}$, $(C_6H_5NH_3)_2B_{20}H_{18}$, and like salts, such as the dicyclohexyl-ammonium and piperidinium salts, can be used in such compositions.

The compounds of the invention are useful as components for high energy fuels. Solutions of the hydrazine salts in a hydrazine, as well as solutions of other salts of Formula 1 in a hydrazine, are useful as propellant fuels, either alone or in combination with an oxidant.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula $$M_a(B_{20}H_{18})_b$$

wherein $a$ and $b$ are the smallest positive whole numbers which satisfy the equation $$b = \frac{a \cdot \text{valence of M}}{2}$$

and M is a cation selected from the class consisting of $NH_4^+$, $RNH_3^+$, $R_2NH_2^+$, $NH_2NH_3^+$, $R'NHNH_3^+$, $R'NHNR'H_2^+$, and $R'_2NNH_3^+$, wherein R and R' are monovalent organic groups of up 18 carbons bonded to the nitrogen through carbon.

2. A compound of claim 1 in the hydrated form.

3. A compound of claim 1 wherein R, taken separately, is a group of up to 18 carbon atoms and is selected from the class consisting of alkyl, cycloalkyl, alkenyl, cycloalkenyl, aryl, aralkyl, and alkaryl, wherein any substituents on the above hydrocarbyl radicals are selected from the class consisting of hydrogen, halogen, cyano, hydroxyl, and amine, and, taken together, forms a heterocyclic group with nitrogen, and R' is a group of up to 8 carbon atoms selected from the class consisting of alkyl and aryl.

4. $(NH_4)_2B_{20}H_{18}$.
5. A compound of claim 4 in the hydrated form.
6. $[(CH_3)_2CHNH_3]_2B_{20}H_{18}$.
7. A compound of claim 6 in the hydrated form.
8. $(C_6H_5NH_3)_2B_{20}H_{18}$.
9. A compound of claim 8 in the hydrated form.
10. $(NH_2NH_3)_2B_{20}H_{18}$.
11. A compound of claim 10 in the hydrated form.

References Cited

UNITED STATES PATENTS

| 3,148,938 | 9/1964 | Knoth | 23—358 |
|---|---|---|---|
| 3,149,163 | 9/1964 | Knoth | 260—583 |
| 2,521,026 | 9/1950 | Solomon | 149—36 |
| 2,934,417 | 4/1960 | Schulze | 149—36 |
| 2,992,885 | 7/1961 | Jackson et al. | 23—14 |
| 3,051,546 | 8/1962 | Miller | 23—14 |

OTHER REFERENCES

Kaczmarcyzk et al.: "Proceedings of The National Academy of Sciences, U.S.A.," volume 48, pp. 729–733 (May 1962).

EARL C. THOMAS, *Primary Examiner.*

H. S. MILLER, *Assistant Examiner.*

U.S. Cl. X.R.

260—606.5

PO-1050
(5/69)

UNITED STATES PATENT OFFICE
CERTIFICATE OF CORRECTION

Patent No. 3,431,089            Dated March 4, 1969

Inventor(s)   VAUGHN A. ENGELHARDT

It is certified that error appears in the above-identified patent and that said Letters Patent are hereby corrected as shown below:

Column 3, line 7, first formula, that portion reading "$[(C_2H_7)_2-$" should read -- $[(C_3H_7)_2-$ --; line 11, first formula, that portion reading "$-C_2N_3)-$" should read -- $-CH_2NH_3)-$ --.

Column 10, line 17, "ressitors" should be -- resistors --; line 62, after "up" insert -- to --.

SIGNED AND
SEALED
DEC 8 1970

(SEAL)
Attest:

Edward M. Fletcher, Jr.
Attesting Officer

WILLIAM E. SCHUYLER, JR.
Commissioner of Patents